April 18, 1933. J. H. DORAN 1,904,421
BUCKET WHEEL
Filed Oct. 1, 1931
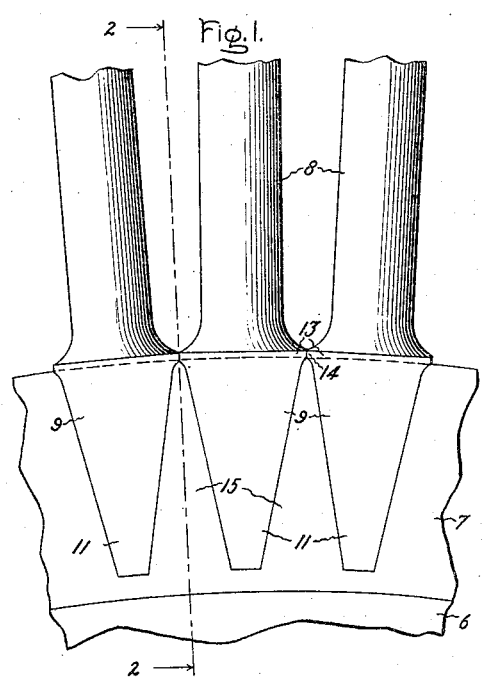
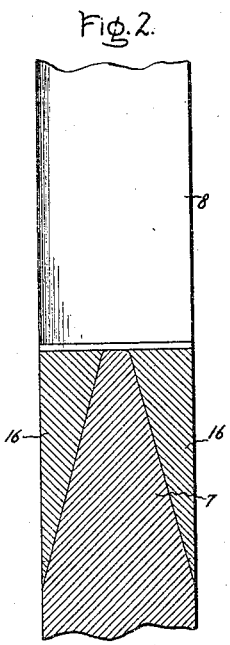
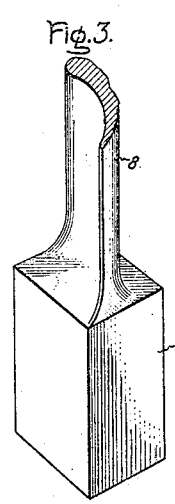
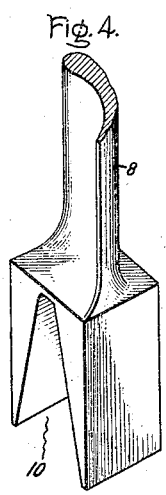
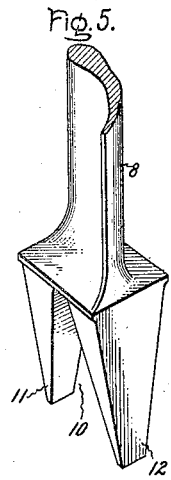
Inventor:
John H. Doran,
by Charles E. Tullar
His Attorney Patented Apr. 18, 1933

1,904,421

UNITED STATES PATENT OFFICE

JOHN H. DORAN, OF SCOTIA, NEW YORK, ASSIGNOR TO GENERAL ELECTRIC COMPANY, A CORPORATION OF NEW YORK

BUCKET WHEEL

Application filed October 1, 1931. Serial No. 566,291.

The present invention relates to bucket wheels for elastic fluid turbines, more particularly to bucket wheels for the lower stages of modern high power turbines although it is not limited thereto. In wheels of this kind a row of blades or buckets is secured by suitable means such as welding to the rim of a web or disk which in turn is carried by a rotary shaft. The high speed and weight of these blades or buckets cause considerable centrifugal forces which may effect loosening thereof, resulting in damage of the blades and adjacent parts such as diaphragms interposed between consecutive bucket wheels.

It is therefore important in the manufacture of turbine bucket wheels that the blades or buckets are all very securely attached to the rim of the wheels.

The object of the invention is to provide an improved arrangement for securing a row of blades or buckets to a wheel.

For a consideration of what I believe to be novel and my invention, attention is directed to the following specification and the claims appended hereto.

In the accompanying drawing, Fig. 1 is a fragmentary view of a bucket wheel; Fig. 2 is a cross section along line 2—2 of Fig. 1, and Figs. 3, 4 and 5 represent a bucket in different stages of the manufacturing process.

Referring to the driving, 6 designates a web or disk having a rim portion 7, which is beveled in radial direction to form an annular projection of substantially V-shaped or triangular cross section. 8 designates the blades or buckets which are fastened to the rim of the wheel. Each bucket is provided with a base portion 9 which forms an integral part with the bucket and engages the rim.

In manufacturing, the base portion has primarily a prismatic form, as shown in Fig. 3. I provide a V-shaped groove 10 in the base portion as indicated in Fig. 4, and thereafter I bevel according to my invention the sides of the base portion as shown in Fig. 5, which represents the final shape of the base portion. It will be readily seen that the blade is thus provided with front and rear, downwardly projecting, pyramidal portions 11 and 12 respectively. In assembling, these front and rear projecting portions or legs straddle the V-shaped rim portion of the wheel. The upper parts 13 of the base portions may engage each other, as indicated at 14. The downwardly projecting legs define V-shaped overhung recesses or spaces 15 which, acording to my invention, are filled with welding material as shown at 16 in Fig. 2.

The beveling of the side portions of the bucket bases forms an important part of my invention as it provides for large spaces between the base portions of adjacent buckets. This allows a very substantial attachment of each bucket to the wheel so that even if some of the welding is defective the remainder will hold the bucket.

With my invention I accomplish a cheap and reliable construction of a turbine bucket wheel in which the buckets are integrally united with the rim of the wheel.

What I claim as new and desire to secure by Letters Patent of the United States is:—

1. A bucket wheel having a rim and row of buckets secured to the rim, the buckets being provided with base portions having projections straddling the rim of the wheel, said projections having portions engaging each other and other portions defining overhung recesses between the other portions of adjacent buckets, and means for integrally uniting adjacent base portions to each other and to the rim comprising welding material filling said overhung recesses.

2. An elastic fluid turbine bucket wheel having a web, a rim and buckets fastened to the rim, the rim forming a V-shaped annular projection of the web, the buckets being provided with legs straddling the rim of the wheel and having portions engaging each other and other portions defining overhung recesses between the other portions, and the other portions of adjacent buckets being integrally united with each other and with the rim by welding material filling said overhung recesses.

3. An elastic fluid turbine bucket wheel having a web, a rim and buckets fastened to the rim, the rim forming a V-shaped annular projection of the web, each bucket having a base portion comprising a front and a rear projection of substantially pyramidal form, these projections straddling the rim of the wheel and having portions engaging each other and other portions defining substantially V-shaped overhung recesses between the other portions of adjacent buckets, and the adjacent buckets being united to each other and to the rim by welding material filling said overhung recesses.

4. A bucket wheel having a V-shaped rim and a row of buckets, each bucket having two projections defining a V-shaped recess and straddling the rim whereby the V-shaped recess receives a portion of the V-shaped rim, an upper portion of each projection engaging corresponding portions of the projections of adjacent buckets, the lower portion of each projection being partly cut away to define with the lower portions of adjacent buckets V-shaped recesses to receive sufficient welding material for securing the buckets to the rim.

In witness whereof, I have hereunto set my hand.

JOHN H. DORAN.